United States Patent
Riedl et al.

(10) Patent No.: US 9,191,334 B2
(45) Date of Patent: Nov. 17, 2015

(54) METHOD FOR IMPROVING THE QUALITY OF DATA TRANSMISSION IN A PACKET-BASED COMMUNICATION NETWORK

(75) Inventors: Johannes Riedl, Ergolding (DE); Matthias Scheffel, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 13/982,214

(22) PCT Filed: Jan. 20, 2012

(86) PCT No.: PCT/EP2012/050873
§ 371 (c)(1),
(2), (4) Date: Jul. 26, 2013

(87) PCT Pub. No.: WO2012/101054
PCT Pub. Date: Aug. 2, 2012

(65) Prior Publication Data
US 2013/0315062 A1    Nov. 28, 2013

(30) Foreign Application Priority Data
Jan. 28, 2011  (DE) .......................... 10 2011 003 321

(51) Int. Cl.
*G01R 31/08* (2006.01)
*H04L 12/863* (2013.01)
*H04L 12/24* (2006.01)
(Continued)

(52) U.S. Cl.
CPC ............ *H04L 47/50* (2013.01); *H04L 41/0663* (2013.01); *H04L 43/0852* (2013.01); *H04L 45/22* (2013.01); *H04L 45/28* (2013.01); *H04L 47/11* (2013.01); *H04L 47/122* (2013.01);
(Continued)

(58) Field of Classification Search
None
See application file for complete search history.

(56) References Cited

U.S. PATENT DOCUMENTS

| 6,222,822 B1 | 4/2001 | Gerardin et al. |
| 2002/0118641 A1 | 8/2002 | Kobayashi |
| 2004/0006613 A1* | 1/2004 | Lemieux et al. ............... 709/223 |
| 2006/0045011 A1* | 3/2006 | Aghvami et al. .............. 370/230 |

(Continued)

FOREIGN PATENT DOCUMENTS

| GB | 2404826 A | 2/2005 |
| GB | 2467424 A | 8/2010 |
| WO | WO2004102898 A1 | 11/2004 |

OTHER PUBLICATIONS

PCT International Search Report dated Apr. 12, 2012 for corresponding PCT/EP2012/050873 with English translation.
(Continued)

*Primary Examiner* — Duc C Ho
(74) *Attorney, Agent, or Firm* — Lempia Summerfield Katz LLC

(57) ABSTRACT

The embodiments relate to a method for improving the quality of data transmission in a packet-based communication network comprising a plurality of network nodes. Each network node has a number of ports with which at least one queue is associated respectively, and by which ports a communication connection to another network node may be produced. At least the queues of those ports that are arranged, in the network nodes, along respective communication paths that are formed in the communication network, are monitored for their queue length. A degree of overload of the affected port(s) is determined from the queue length, and a runtime delay and/or a delay variation in the data transmission may be inferred. The overload amount rises above a predetermined threshold value for at least one of the communication paths running across an overloaded port.

21 Claims, 5 Drawing Sheets

(51) Int. Cl.
  *H04L 12/26* (2006.01)
  *H04L 12/707* (2013.01)
  *H04L 12/703* (2013.01)
  *H04L 12/801* (2013.01)
  *H04L 12/803* (2013.01)
  *H04L 12/851* (2013.01)
  *H04L 12/835* (2013.01)

(52) U.S. Cl.
  CPC ............... *H04L47/18* (2013.01); *H04L 47/24* (2013.01); *H04L 47/29* (2013.01); *H04L 47/30* (2013.01)

(56) References Cited

U.S. PATENT DOCUMENTS

2008/0008202 A1   1/2008   Terrell et al.
2008/0205265 A1   8/2008   Del Regno et al.

OTHER PUBLICATIONS

European Office Action dated Jul. 17, 2014 for corresponding Application No. 12 702 460.2 with English translation.
German Office Action dated Sep. 23, 2011 for corresponding DE 10 2011 003 321.1, with English Translation.
Chinese Office Action mailed Feb. 17, 2015, cited in related Chinese Application No. 201280006638.5, with English translation.

\* cited by examiner

METHOD FOR IMPROVING THE QUALITY OF DATA TRANSMISSION IN A PACKET-BASED COMMUNICATION NETWORK

The present patent document is a §371 nationalization of PCT Application Serial Number PCT/EP2012/050873, filed Jan. 20, 2012, designating the United States, which is hereby incorporated by reference. This patent document also claims the benefit of DE 10 2011 003 321.1, filed on Jan. 28, 2011, which is also hereby incorporated by reference.

BACKGROUND

The present embodiments relate to improving the quality in a packet-based communication network that includes a plurality of network nodes In many applications distributed across a communication network, the data transmission with respect to an end-to-end delay (e.g., delay) and/or a delay variation (e.g., jitter) is to not exceed specified limit values, so that the desired quality of service of the application is achieved. This applies, for example, to communication networks developed in the industrial sphere (e.g., for plant automation, process automation or energy automation). Only network technologies based on time division multiplexing (TDM) may meet predefined requirements for delay values and jitter values along communication paths embodied within the communication network. Network technologies that may be suitable in this connection are synchronous digital hierarchy (SDH) or asynchronous transfer mode (ATM) networks. Because of complexity and high costs (e.g., in the case of scaling), the network technologies may not be deployed in many application scenarios.

For reasons of complexity and the low costs, even in the case of scaling, packet-based communication networks may be deployed. Such communication networks are, for example, communication networks based on Ethernet or Internet Protocol (IP). However, one problem with packet-based communication networks is that no guarantees may be given as regards delay and/or jitter.

Although complex extensions of Ethernet (e.g., an isochronous real-time transmission (IRT) for PROFINET) that emulate a deterministic behavior of the communication network by TDM are known in the field of Industrial Ethernet, this technology may only be deployed with the use of special hardware and a highly complex configuration.

SUMMARY AND DESCRIPTION

A method with which the quality of data transmission in a packet-based communication network may be improved is provided. A network node of a packet-based communication network that permits an improvement in the quality of data transmission in the packet-based communication network is provided. A packet-based communication network that has a high quality of data transmission is provided.

A method for improving the quality of data transmission in a packet-based communication network that includes a plurality of network nodes is provided. Each network node of the plurality of network nodes has a number of ports. At least one queue is associated with each of the ports, and a communication connection to another network node may be produced via each of the ports. In the method, at least the queues of the ports are monitored for queue length. The ports are disposed along respective communication paths formed in the communication network in the network nodes. A degree of overload is determined for the port(s) in question from the queue length. A runtime delay (e.g., delay) and/or delay variation (e.g., jitter) in the data transmission may be inferred from the degree of overload of the communication path(s) running via the overloaded port in question. If the degree of overload exceeds a predefined threshold value, an alternative communication path bypassing the overloaded ports is set up for at least one of the communication paths that is routed via an overloaded port.

In one or more of the present embodiments, a network node of a packet-based communication network including a plurality of network nodes is provided. The network node includes a plurality of ports. At least one queue is associated with each port of the plurality of ports, and a communication connection to another network node may be produced via the nodes. The network node includes a first device for monitoring, for queue lengths, the queues of the ports that are disposed in the network nodes along respective communication paths formed along the communication network. The network node further includes a second device for determining the degree of overload from the queue length for the port(s) in question.

A packet-based communication network that includes a plurality of network nodes and a network management instance for setting up communication paths and/or alternative communication paths using routing mechanisms in the communication network is provided. The network management instance includes a third device, using which a runtime delay (e.g., delay) and/or delay variation (e.g., jitter) in the data transmission for communication paths running via the overloaded port(s) in question may be inferred from the degree of overload obtained from a respective network node. The network management instance further includes a fourth device, using which, if the degree of overload exceeds a predefined threshold value, an alternative communication path bypassing the overloaded port may be set up for at least one of the communication paths that is routed via an overloaded port.

Determinism is achieved in packet-oriented communication networks, such as, for example, communication networks based on the Internet Protocol, or Ethernet. The result is a high transmission quality as regards delay and/or jitter for the communication paths formed in the communication network. One advantage of the procedure is that there is no need for a complex calculation of absolute delay values and/or jitter values in order to establish that a delay-critical and/or jitter-critical situation exists within the communication network. This applies, for example, on the assumption that the delay and/or jitter requirements are adhered to without difficulty in the otherwise almost empty communication network (e.g., there is no overload or congestion situation). Another advantage is that very little modification is necessary in the network node in order to implement the procedure. Another advantage is that the method also provides scalability in large communication networks. This is provided because with the method, delay values or jitter values may only be monitored for each queue and network node, but not for each communication path.

In one embodiment, the alternative communication path is set up to bypass the nodes that include at least one overloaded port. As a result, the route of the alternative communication path is routed around the node with the overloaded port. This may be advantageous if the performance of the whole network node is already being negatively impacted by a port being overloaded.

According to another embodiment, one of the following queue lengths is processed to determine the degree of overload: an average queue length, where the average queue lengths are calculated from the average over time of several recorded queue lengths of a queue over a predefined period; and/or a maximum queue length and/or an effective queue length that is determined from temporally preceding and current queue lengths. On the basis of the specified queue lengths, suitable communication paths may be determined for delay-critical or jitter-critical communication paths.

According to another embodiment, the communication paths and/or the alternative communication paths are set up by a higher-level network management instance using routing mechanisms. The network management instance serves to actively create communication paths in the packet-based communication network. The active creation of communication paths by the network management instance may be effected, for example, analogously to Multi Protocol Label Switching (MPLS). The queue lengths of some ports of the network nodes are, for example, used as a criterion for good or poor communication paths. The network management instance may be embodied by a central processor, a control unit of one of the network nodes or a plurality of processors and control units.

In the further embodiment, the queue lengths of the ports of the plurality of network nodes are interrogated at predefined intervals by the higher-level network management instance, where the network management instance determines the degree of overload for each of the ports. Alternatively, the queue lengths of the ports of the plurality of network nodes are transmitted from the network nodes to the higher-level network management instance at predefined time intervals and/or as a function of a predefined global or individual network node threshold value being exceeded. The network management instance determines the degree of overload for each of the ports.

When setting up the new communication path, at least the degrees of overload of the ports that are disposed in the network nodes along the new communication paths are taken account of. When setting up a new degree of communication, the shortest connection between source node and destination node is thus not always the outcome when the new communication path is set up. Instead, the load on the respective network nodes or the ports lying in a potential communication path are additionally taken into account.

In this connection, a first low threshold value may be defined for the degree of overload (or the queues) of the ports that are disposed in the network node along the new communication path. If the first low threshold is exceeded, the new communication path is set up such that the nodes for the new communication path that have at least one overloaded port with a degree of overload that exceeds the first threshold value are disregarded, or the overloaded ports of nodes with a degree of overload that exceeds the first threshold value are disregarded.

In another embodiment, a second higher threshold value for the degree of overload (or the queue length of the queues) of the ports that are disposed in the network nodes along the new communication path is defined. If the second higher threshold is exceeded, alternative communication paths are determined and set up for existing communication paths.

By providing the first threshold value and the second comparatively higher threshold value, the load of a network node or of an overloaded port may thus be selectively controlled as regards the data transmitted via the network node or the overloaded port. Depending on the queue length determined, not only is the new communication path selectively routed around the overloaded port or the network node in question in some cases, but a communication path already going via the overloaded port is also rerouted.

According to another embodiment, the degrees of overload (or the queue lengths) are monitored as a function of a traffic class of the queue in question. If, in addition to high-priority data traffic, low-priority data traffic also occurs, the low-priority data traffic may cause increased delay and/or jitter in high-priority data traffic. For example, this may be caused by an inappropriate implementation of a scheduler in the network nodes or by the arrival of a high-priority data packet while a long low-priority data packet is still being sent. Such critical situations, which are caused by the low-priority data traffic, may be reliably identified by taking into account the queue lengths of different traffic classes. By the above-described strategy of rerouting particular communication paths, the overall load in the communication network may be improved. As a result, determinism in the packet-based communication network may be achieved to improve the quality of data transmission.

Another embodiment provides that end-to-end values for the runtime delay and/or the delay variance on the communication paths in question may be determined from the determined degrees of overload or the queue lengths of the queues that are disposed in the network node along respective communication paths formed in the communication network.

The procedure is thus based on the dynamic use of queue lengths of the ports of the network nodes to identify delay-critical and/or jitter-critical situations in conjunction with the regular interrogation of the queue lengths or corresponding messages by the network nodes if predefined threshold values are exceeded. On the basis of the information about the queue lengths of the ports of the network nodes present in the communication network, suitable communication paths for delay-critical or jitter-critical traffic flows are calculated. An advantage of the procedure is that there is no dependency on the detailed implementation of a scheduler or on a scheduler concept used.

DETAILED DESCRIPTION

Figure 1:
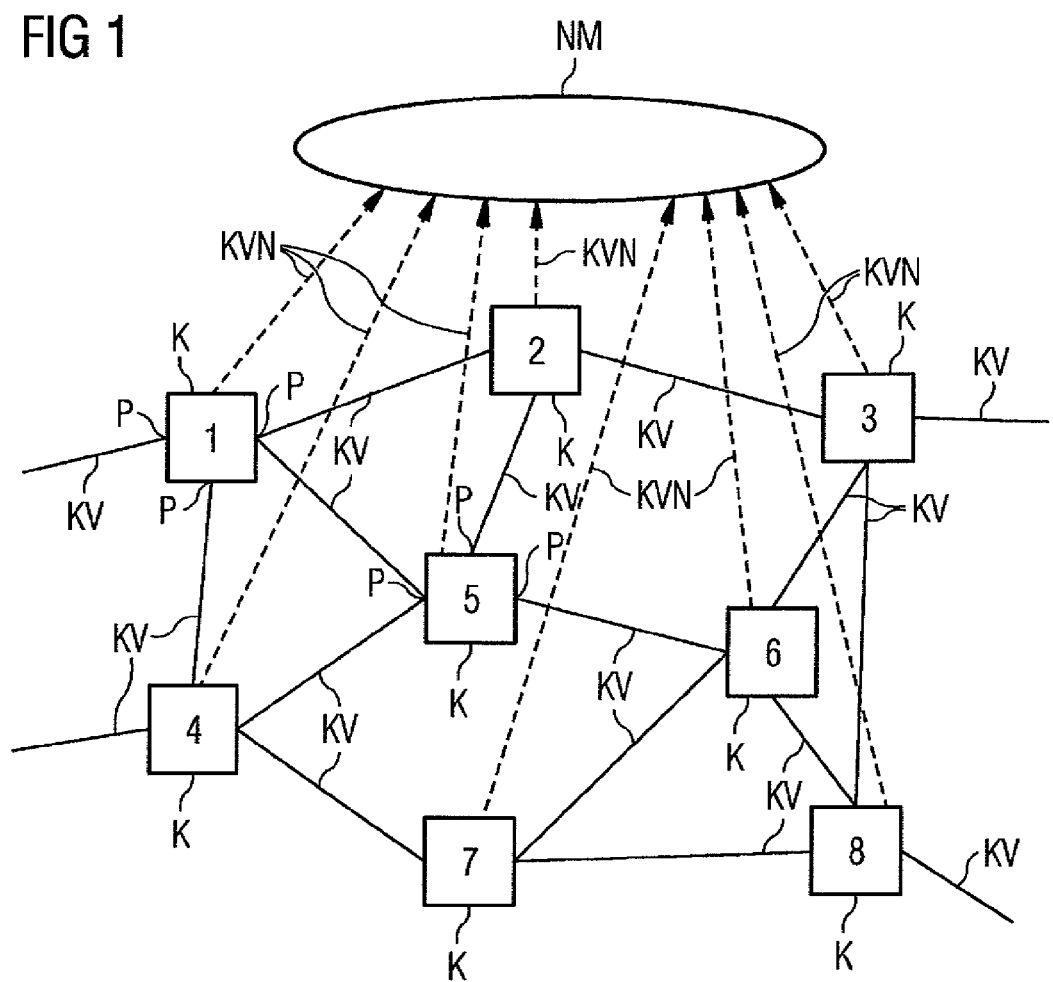
FIG. 1 shows one embodiment of a communication network including a plurality of network nodes and a higher-level network management instance.

FIG. 1 shows a communication network including a plurality of network nodes K and a network management instance NM. The network nodes K are numbered from 1 to 8, where the figures represent a respective address of the network nodes K. Each of the network nodes K has a number of ports P, via which a communication connection KV to another network node K may be produced. In the present exemplary embodiment, the number of communication connections exiting from a node K corresponds to the number of ports. A respective node may have a larger number of ports than communication connections. Only for the nodes K characterized with the addresses 1 and 5 are the ports P provided with reference characters. The communication connections KV may, depending on the type of the communication network, be line-based or wireless in nature. For wireless communication connections KV, for example, communication connections other than those illustrated in FIG. 1 may be formed between the nodes K.

The network management instance NM is higher ranking than the nodes K. The network management instance, which, for example, is formed by a central processor, is able, via respective communication connections KVN, to exchange data with the network nodes K. The communication connections KVN, which are illustrated in FIG. 1, are merely of a logical nature and do not need to exist directly between the respective network nodes K and the network management instance NM. The way in which data is exchanged between the network management instance and the network node K (e.g., wirelessly or line-bound) is of secondary importance.

To enable predefined requirements for the data transmission as regards an end-to-end delay (e.g., delay) and/or delay variation (e.g., jitter) to be met during a data transmission between a network node K acting as a source node and a network node K of the communication network acting as a destination node, active management of the communication paths created in the communication network is effected in the packet-based communication network according to FIG. 1 under the control of the network management instance NM. For example, end-to-end delay values and jitter values may, for example, become critical if because of packet buffering (e.g., queuing) packet congestion arises in the network nodes K along a particular communication path between source and destination nodes, and causes variable forwarding times in the individual network nodes. The reasons for this are, for example, the blockage of an exit port by transmitting another packet or the preferential handling of other buffered packets with a higher priority. Because the delay may not be deterministic, variable delay values and jitter values may arise.

The task of the network management instance is firstly to set up and manage the communication paths formed in the communication network. Secondly, it is the task of the network management instance to monitor for a queue length of at least the queues of the ports that are disposed in the network nodes along respective communication paths formed in the communication network. The network management instance may determine a degree of overload for the ports from the queue length. A problem including delay and/or jitter in the data transmission may be inferred from the degree of overload for the communication path(s) running via the overloaded port in question. Multiple queues may be present per port P of a network node and are assigned to one or more priorities (e.g., traffic classes). The priorities are, for example, defined via IEEE 802.1P Class of Service (CoS) or IP Type of Service (ToS). If the degree of overload in question exceeds a predefined threshold value (e.g., if the queue length of a queue of a port is greater than the predefined threshold value), an alternative communication path bypassing the overloaded ports is set up for at least one of the communication paths that is routed via an overloaded port. These paths are selected such that the critical ports P or network nodes are not used.

The degree of overload may be a value directly proportional to the queue length. The degree of overload may also correspond to the queue length (e.g., the number of bytes of a time until execution of the queue).

Figure 2:
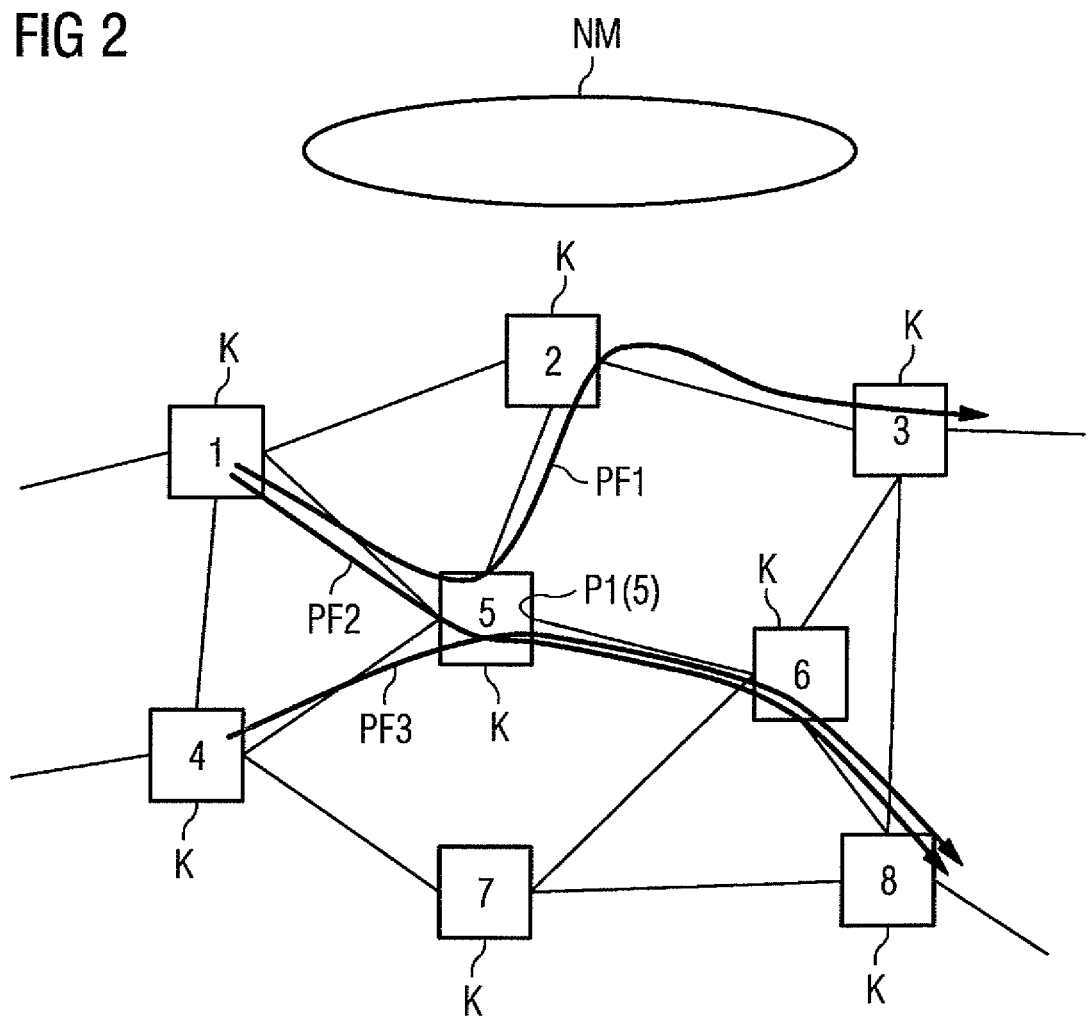
FIG. 2 shows one embodiment of the communication network from FIG. 1, in which three paths set up by the network management instance are illustrated.
Figure 3:
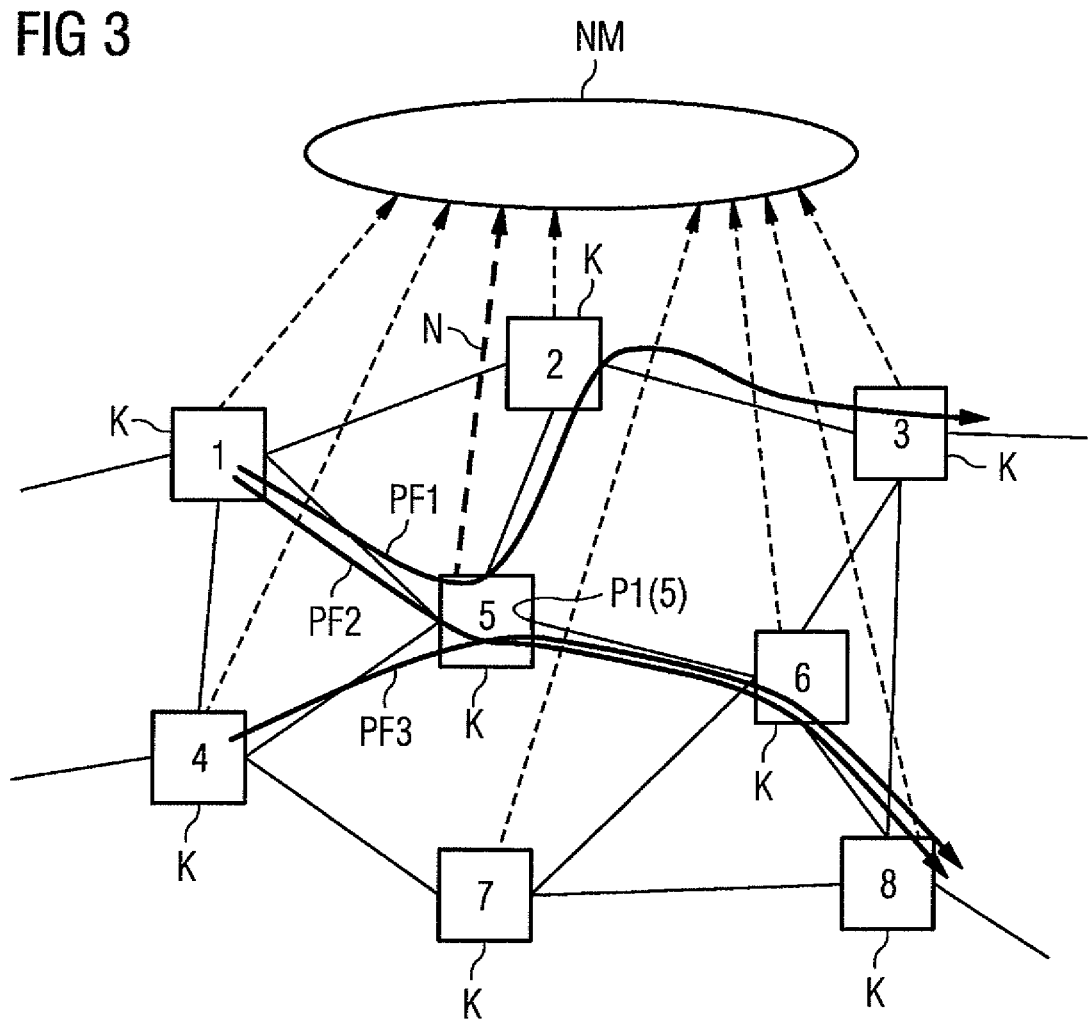
FIG. 3 shows one embodiment of the communication network from FIG. 2, in which one of the network nodes reports an overloaded port to the network management instance.
Figure 4:
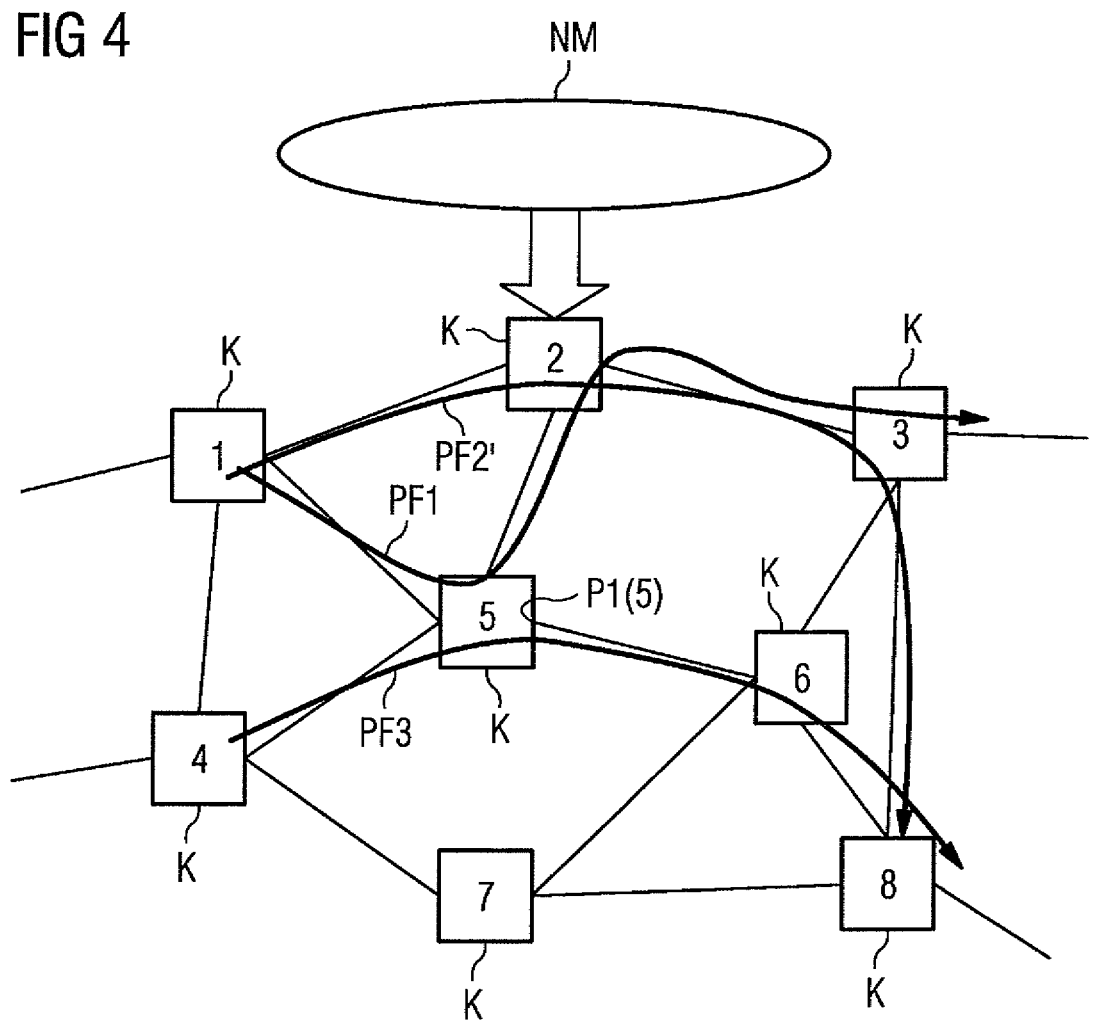
FIG. 4 shows one embodiment of the communication network according to FIG. 2, in which one of the original communication paths has been set to an alternative route.

FIG. 2 shows, for example, the communication network described in FIG. 1, in which three communication paths PF1, PF2, PF3 are set up by the network management instance NM. The communication path 1 runs from the network node 1 via the network nodes 5 and 2 to the network node 3. The communication path PF2 runs from the network node 1 via the network nodes 5 and 6 to the network node 8. The communication path PF3 runs from the network node 4 via the network nodes 5 and 6 to the network node 8. In the selected exemplary embodiment, all three communication paths PF1, PF2 and PF3 are thus routed via the network node 5. The communication paths PF2 and PF3 are further routed via a shared port P1(5). As a result of this, packet congestion may arise at the port P1(5) and may lead to delay and/or jitter both for the communication path PF2 and for the communication path PF3. If a degree of overload formed from the queue length at the port P1(5) exceeds a predefined threshold value, then according to FIG. 3, a message N is transmitted to the network management instance NM by the network node 5.

The network management instance NM may infer the possible occurrence of a problem including delay and/or jitter from the degree of overload for the communication paths PF2, PF3 running via the port P1(5). Because of this, the network management instance NM undertakes a reconfiguration of one of the two communication paths PF2, PF3. In the present exemplary embodiment, an alternative communication path PF2' is created for the communication path PF2 and runs from the network node 1 via the network nodes 2 and 3 to the network node 8.

To set up the communication paths, the network management instance NM, for example, uses known routing methods. The communication paths may, for example, be set up by direct entries in Layer-3 routing or Layer-2 forwarding tables. A setup or adjustment may also be implemented by adjusting metrics influencing the routing tables or forwarding tables. These may, for example, be Open Shortest Path First (OSPF) weightings or link costs and priorities in Rapid Spanning Tree (RSTP) or Multiple Spanning Tree (MSTP). Corresponding mechanisms and procedures are known to the person skilled in the art from the prior art.

The data transmission from a source node to a destination node may initially be effected along pre-set default paths. This provides that a default path is initially formed independently of the queue lengths of the queues along which the communication path runs. The network management instance NM only intervenes if a problem situation has been established during the continuous monitoring of the network nodes K and the queues.

Figure 5:
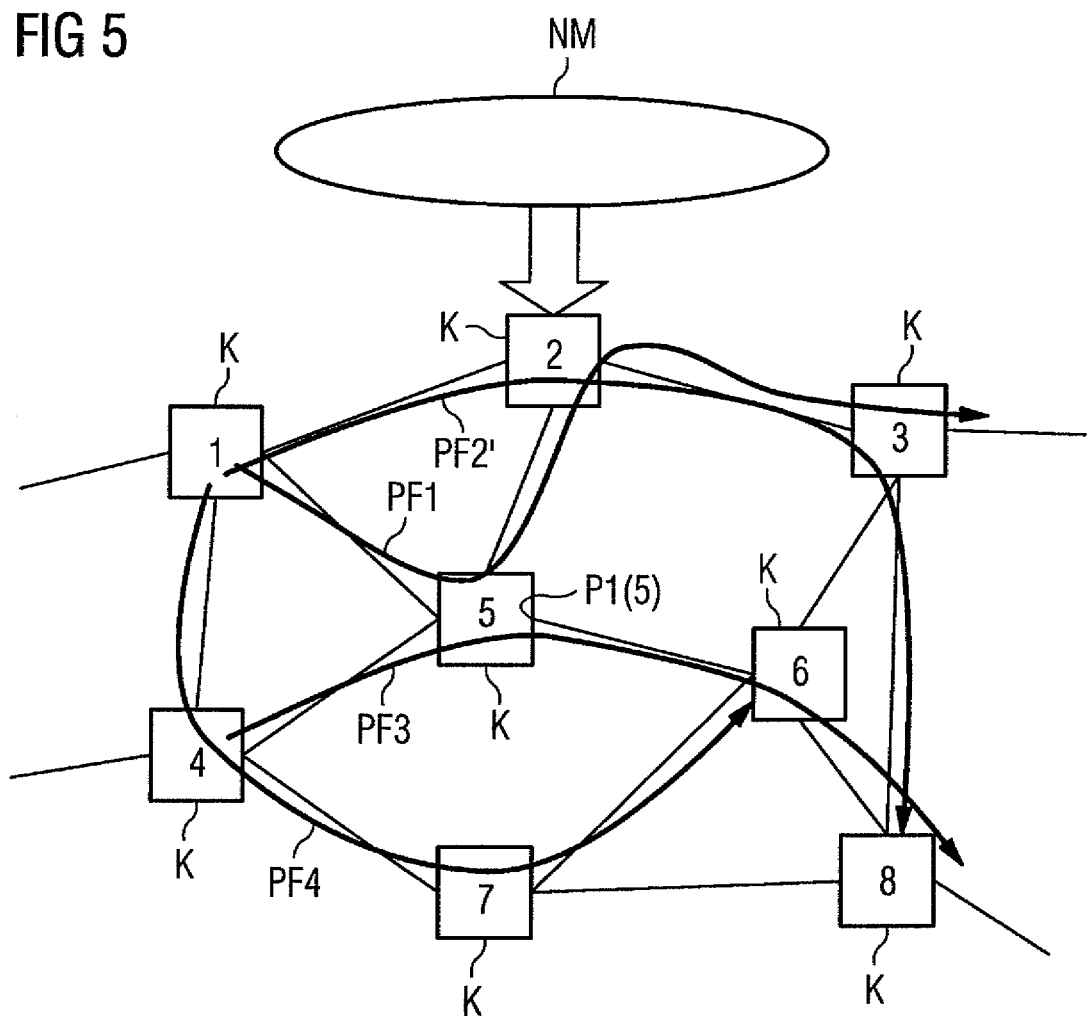
FIG. 5 shows one embodiment of the communication network from FIG. 2, in which a new communication path has been set up.

Requests to set up new communication paths may be processed such that a new communication path avoids the critical ports or network nodes. This is illustrated by way of example in FIG. 5, where via the communication paths according to FIG. 3, a new communication path PF4 from the network node 1 via the network nodes 4 and 7 to the network node 6 is illustrated. Although the shortest way from the network node 1 to the network node 6 would run via the port P1(5) of the network node 5, a path via the network nodes 4 and 7 is selected in order to evade the congestion suggested at port P1(5) of the network node 5.

To set up new communication paths, a first low threshold value and a second comparatively higher threshold value may be established. If the first low threshold value is exceeded, new communication paths, such as the communication path PF4, which is in addition to the existing communication paths PF1, PF2' and PF3, is set up via alternative network nodes. If the second higher threshold value is exceeded, some of the existing communication paths are also rerouted.

One or more threshold values centrally may be individually defined for each of the network nodes, so that a network node K sends a message to the network management instance NM if the respective limits are exceeded. This makes it unnecessary for the management instance to continuously interrogate the statuses and thus saves on communication resources.

To determine the degree of overload, an average queue length may be used. The average queue length is calculated from the average over time of multiple recorded queue lengths over a predefined period. As a result, large fluctuations may be avoided. Alternatively, a maximum queue length may also be defined. This may, for example, correspond to the second higher threshold value. An effective queue length may also be used to determine the degree of overload. The effective queue length is determined from temporally preceding and current queue lengths. As a result, the history of the queue may be taken into account, where, for example, an exponential smoothing may be effected.

In another embodiment, the queue length may just be monitored for particular traffic classes (e.g., a particular priority class), because the queue length may carry the data traffic that is sensitive to delay and jitter.

Besides taking into account an overshoot or undershoot of average, maximum or effective queue lengths by the degree of overload, this may also be used by the management system instance to derive absolute end-to-end values for the delay or jitter. For this purpose, multiple delay components are added: the degree of overload offset against the respective bandwidths of the links; the delays arising in the network nodes as a result of switching operations, which may be estimated or measured; propagation delays on all involved communication connections, which may be estimated or measured (e.g., with the aid of corresponding mechanisms that are standardized in connection with clock time synchronization according to IEEE 1588 or 802.1as). This is advantageous, for example, if current delay values and/or jitter values are to be reported to an application causing the data traffic or if a communication path may only be set up under the secondary condition of a particular delay value or jitter value not being exceeded.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for improving the quality of data transmission in a packet-based communication network comprising a plurality of network nodes, wherein each network node of the plurality of network nodes has a plurality of ports, each port of the plurality of ports being associated with at least one queue with which a communication connection to another network node of the plurality of network nodes is producible, the method comprising:
    monitoring at least the queues of ports of the plurality of ports that are disposed in the network nodes along communication paths that are formed in the communication network for queue length;
    determining a degree of overload for the ports from the queue length; and
    establishing an alternative communication path for at least one runtime delay-critical, delay variation-critical, or runtime delay-critical and delay variation-critical communication path of the communication paths that is routed via an overloaded port when the degree of overload exceeds a predefined threshold value, the established alternative communication path bypassing the overloaded port.

2. The method as claimed in claim 1, wherein the established alternative communication path bypasses the network nodes that comprise the overloaded port.

3. The method as claimed in claim 2, wherein determining the degree of overload comprises processing an average queue length, wherein the average queue length is calculated from an average over time of multiple recorded queue lengths of a queue over a predefined period, processing a maximum queue length-processing an effective queue length that is determined from temporally preceding and current queue lengths, or a combination thereof.

4. The method as claimed in claim 1, wherein determining the degree of overload comprises processing an average queue length, wherein the average queue length is calculated from an average over time of multiple recorded queue lengths of a queue over a predefined period, processing a maximum queue length, processing an effective queue length that is determined from temporally preceding and current queue lengths, or a combination thereof.

5. The method as claimed in claim 4, wherein the communication paths, the alternative communication path, or a combination thereof is set up by a higher-level network management instance.

6. The method as claimed in claim 5, further comprising interrogating, by the higher-level network management instance, the queue lengths of the ports at predefined intervals,
    wherein the higher-level network management instance determines the degree of overload for each of the ports.

7. The method as claimed in claim 5, further comprising transmitting the queue lengths of the ports from the network nodes to the higher-level network management instance at predefined time intervals, as a function of a predefined global or individual network node threshold value being exceeded, or a combination thereof,
    wherein the higher-level network management instance determines the degree of overload for each of the ports.

8. The method as claimed in claim 5, further comprising taking at least the degrees of overload of the ports that are disposed in network nodes along a new communication path into account when the new communication path is established.

9. The method as claimed in claim 8, further comprising defining a first low threshold value for the degree of overload of the ports that are disposed in the network nodes along the new communication path,
    wherein when the defined first low threshold value is exceeded, the new communication path is established such that the nodes for the new communication path that have at least one overloaded port with a degree of overload that exceeds the first threshold value are disregarded, or the overloaded ports of nodes with a degree of overload that exceeds the first threshold value are disregarded.

10. The method as claimed in claim 9, further comprising defining a second higher threshold value for the degree of overload of the ports that are disposed in the network nodes along the new communication path,
  wherein establishing the alternative communication path comprises determining and establishing the alternative communication path when the second higher threshold value is exceeded for the communication paths.

11. The method as claimed in claim 1, wherein the communication paths, the alternative communication path, or a combination thereof is set up by a higher-level network management instance.

12. The method as claimed in claim 11, further comprising interrogating, by the higher-level network management instance, the queue lengths of the ports at predefined intervals,
  wherein the higher-level network management instance determines the degree of overload for each of the ports.

13. The method as claimed in claim 11, further comprising transmitting the queue lengths of the ports from the network nodes to the higher-level network management instance at predefined time intervals, as a function of a predefined global or individual network node threshold value being exceeded, or a combination thereof,
  wherein the higher-level network management instance determines the degree of overload for each of the ports.

14. The method as claimed in claim 11, further comprising taking at least the degrees of overload of the ports that are disposed in network nodes of the plurality of network nodes along a new communication path into account when the new communication path is established.

15. The method as claimed in claim 14, further comprising defining a first low threshold value for the degree of overload of the ports that are disposed in the network nodes along the new communication path,
  wherein when the defined first low threshold value is exceeded, the new communication path is established such that the nodes for the new communication path that have at least one overloaded port with a degree of overload that exceeds the first threshold value are disregarded, or the overloaded ports of nodes with a degree of overload that exceeds the first threshold value are disregarded.

16. The method as claimed in claim 15, further comprising defining a second higher threshold value for the degree of overload of the ports that are disposed in the network nodes along the new communication path,
  wherein establishing the alternative communication path comprises determining and establishing the alternative communication path when the second higher threshold value is exceeded for the communication paths.

17. The method as claimed in claim 1, further comprising monitoring the degree of overload as a function of a traffic class of the respective queue.

18. The method as claimed in claim 1, further comprising:
  inferring a runtime delay, a delay variation, or the runtime delay and the delay variation in the data transmission from the degree of overload for the communication paths running via the overloaded ports,
  wherein the at least one communication path is a runtime delay-critical, delay variation-critical, or runtime delay-critical and delay variation-critical communication path.

19. The method as claimed in claim 18, further comprising determining end-to-end values for the runtime delay, the delay variance on the communication paths, or the runtime delay and the delay variance on the communication paths from the determined degree of overload of the queues that are disposed in network nodes of the plurality of network nodes along the communication paths formed in the communication network.

20. A network node of a packet-based communication network including a plurality of network nodes, the network node comprising:
  a plurality of ports, each port of the plurality of ports being associated with at least one queue and a communication connection via each port of the plurality of ports to another network node being producible;
  a monitoring device, the monitoring device configured to monitor, for queue length, queues of ports that are disposed in the plurality of network nodes along communication paths formed in the communication network; and
  a determining device, the determining device configured to determine a degree of overload from the queue length for the ports comprising processing an average queue length, wherein the average queue length is calculated from an average over time of multiple recorded queue lengths of a queue over a predefined period, processing a maximum queue length, processing an effective queue length that is determined from temporally preceding and current queue lengths, or a combination thereof.

21. A packet based communication network comprising:
  a plurality of network nodes, a network node of the plurality of network nodes comprising:
    a plurality of ports, each port of the plurality of ports being associated with at least one queue and a communication connection via each port of the plurality of ports to another network node being producible;
    a monitoring device, the monitoring device configured to monitor, for queue length, queues of ports that are disposed in the plurality of network nodes along communication paths formed in the communication network; and
    a determining device, the determining device configured to determine a degree of overload from the queue length for the ports; and
  a network management instance operable to set up the communication paths, alternative communication paths in the communication network, or the communication paths and the alternative communication paths, wherein the network management instance comprises one or more processors operable to:
    infer a runtime delay, delay variation, or the runtime delay and the delay variation in the data transmission from the degree of overload obtained from a respective network node of the plurality of network nodes for the communication path running via an overloaded port; and
    establish an alternative communication path for at least one runtime delay-critical, delay variation-critical, or runtime delay-critical and delay variation-critical communication path of the communication paths that is routed via the overloaded port, bypassing the overloaded port when the degree of overload exceeds a predefined threshold value.

* * * * *